(12) United States Patent
Thompson et al.

(10) Patent No.: US 6,719,312 B2
(45) Date of Patent: Apr. 13, 2004

(54) STEERING LINKAGE AND BALL JOINT

(75) Inventors: John Thompson, Fonthill (CA); Steven P. Levesque, St. Catharines (CA); Adham El-Haw, St. Catharines (CA)

(73) Assignee: TRW Inc., Lyndhurst, OH (US)

( * ) Notice: Subject to any disclaimer, the term of this patent is extended or adjusted under 35 U.S.C. 154(b) by 33 days.

(21) Appl. No.: 10/054,639

(22) Filed: Jan. 22, 2002

(65) Prior Publication Data
US 2003/0137120 A1 Jul. 24, 2003

(51) Int. Cl.[7] .............................. B62D 7/16; F16C 11/06
(52) U.S. Cl. ..................... 280/93.511; 403/56; 403/128
(58) Field of Search ......................... 280/93.511, 93.51, 280/93.502, 93.503, 93.508; 403/56, 122, 131, 128, 134, 135

(56) References Cited

U.S. PATENT DOCUMENTS

| | | | |
|---|---|---|---|
| 2,049,502 A | * | 8/1936 | Hufferd et al. .............. 403/138 |
| 2,510,406 A | | 6/1950 | Lucas |
| 3,034,810 A | * | 5/1962 | Primeau ....................... 403/56 |
| 4,513,857 A | | 4/1985 | Leach |
| 4,679,957 A | | 7/1987 | Bauer |
| 5,062,655 A | * | 11/1991 | Sommerer ........... 280/124.138 |
| 5,473,955 A | * | 12/1995 | Stinson .......................... 74/43 |
| 5,807,010 A | * | 9/1998 | Parker et al. ................. 403/61 |
| 6,059,480 A | | 5/2000 | Maughan et al. |

FOREIGN PATENT DOCUMENTS

DE 4011179 A1 10/1991

* cited by examiner

Primary Examiner—David R. Dunn
(74) Attorney, Agent, or Firm—Tarolli, Sundheim, Covell & Tummino L.L.P.

(57) ABSTRACT

An apparatus for use in a vehicle comprises a first steering link (30) having a first socket (54), a second steering link (34) having a second socket (70), and a steering knuckle (20) having a through hole (44). A stud (90) comprises first and second stud parts (92, 94). The first stud part (92) comprises a first ball portion (100) received in the first socket (54) to connect the first stud part for pivotal movement relative to the first link, and a shank portion (108) projecting from the first ball portion. The second stud part (94) has a second ball portion (132) received in the second socket (70) to connect the second stud part for pivotal movement relative to the second link. The second stud part (94) has an axially extending through opening (130). The shank portion (108) of the first stud part (92) extends through the through hole (44) in the steering knuckle (20) and through the through opening (130) in the second stud part (94).

10 Claims, 3 Drawing Sheets

STEERING LINKAGE AND BALL JOINT

BACKGROUND OF THE INVENTION

1. Technical Field

The present invention relates to a ball joint that forms part of a vehicle steering linkage, for example, a vehicle ball joint for connecting a steering knuckle with a drag link and a cross tie rod.

2. Description of the Prior Art

A typical motor vehicle steering linkage includes two steering knuckles interconnected by a steering linkage that extends across the vehicle from one side to the other. The steering linkage accepts steering input force from a Pitman arm and transmits that force to the left and right steering knuckles. One known type of steering linkage includes a drag link that extends from the Pitman arm to a first one of the steering knuckles. Steering force is transmitted from the first steering knuckle, through a tie rod, to the other steering knuckle.

SUMMARY OF THE INVENTION

The present invention is an apparatus for use in a vehicle, comprising a first steering link having a first socket fixed for movement with the first link, a second steering link having a second socket fixed for movement with the second link, and a steering knuckle having a through hole. A stud comprises a first stud part and a second stud part. The first stud part comprises a first ball portion received in the first socket to connect the first stud part for pivotal movement relative to the first link and a shank portion projecting from the first ball portion. The second stud part has a second ball portion received in the second socket to connect the second stud part for pivotal movement relative to the second link. The second stud part has a through opening extending axially through the second stud part. The shank portion of the first stud part extends through the through hole in the steering knuckle and through the axially extending through opening in the second stud part.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to a ball joint that forms part of a steering linkage. In particular, the present invention relates to a vehicle ball joint assembly for connecting a steering knuckle with a drag link and a tie rod. The present invention is applicable to various ball joint constructions.

Figure 1:
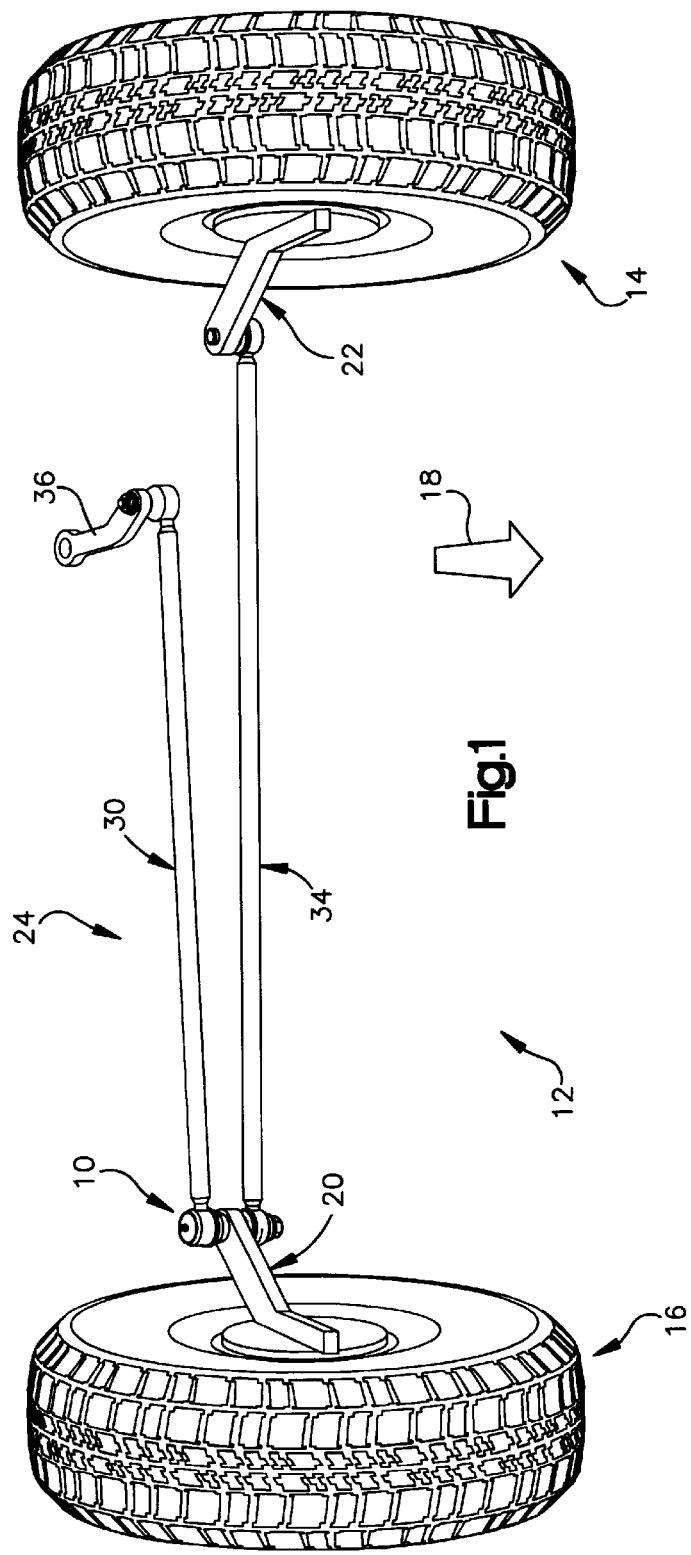
FIG. 1 is a schematic illustration of a portion of a vehicle steering linkage including a ball joint assembly constructed in accordance with a first embodiment of the present invention.

As representative of the invention, FIG. 1 illustrates a ball joint 10 that forms part of a vehicle 12. The vehicle 12 has left and right steerable wheels 14 and 16, which may be front wheels of the vehicle. A forward direction in the vehicle is indicated by the arrow 18.

A steering linkage 24 of the vehicle 12 interconnects the right and left steerable wheels 14 and 16. The steering linkage 24 includes a right steering knuckle 20 connected for pivotal movement with the right steerable wheel 16 of the vehicle 12. The steering linkage 24 also includes a left steering knuckle 22 connected for pivotal movement with the left steerable wheel 14 of the vehicle 12.

The steering linkage 24 also includes a drag link 30 and a tie rod 34. The drag link 30 extends between the right steering knuckle 20 and the vehicle pitman arm 36, which is located on the left side of the vehicle 12. The pitman arm 36 pivots in response to applied steering movement. Pivotal movement of the pitman arm 36 causes the drag link 30 to move. As a result, steering force is transmitted through the drag link 30 and the ball joint 10 to the right steering knuckle 20, and results in steering movement of the right steerable wheel 20.

The motion of the drag link 30 is also transmitted through the ball joint 10 to the tie rod 34. The tie rod 34 extends across the vehicle 12 and is connected to the left steering knuckle 22. As a result, steering force from the drag link 30 is transmitted through the ball joint 10 and the tie rod 34 and results in steering movement of the left steerable wheel 14.

Figure 2:
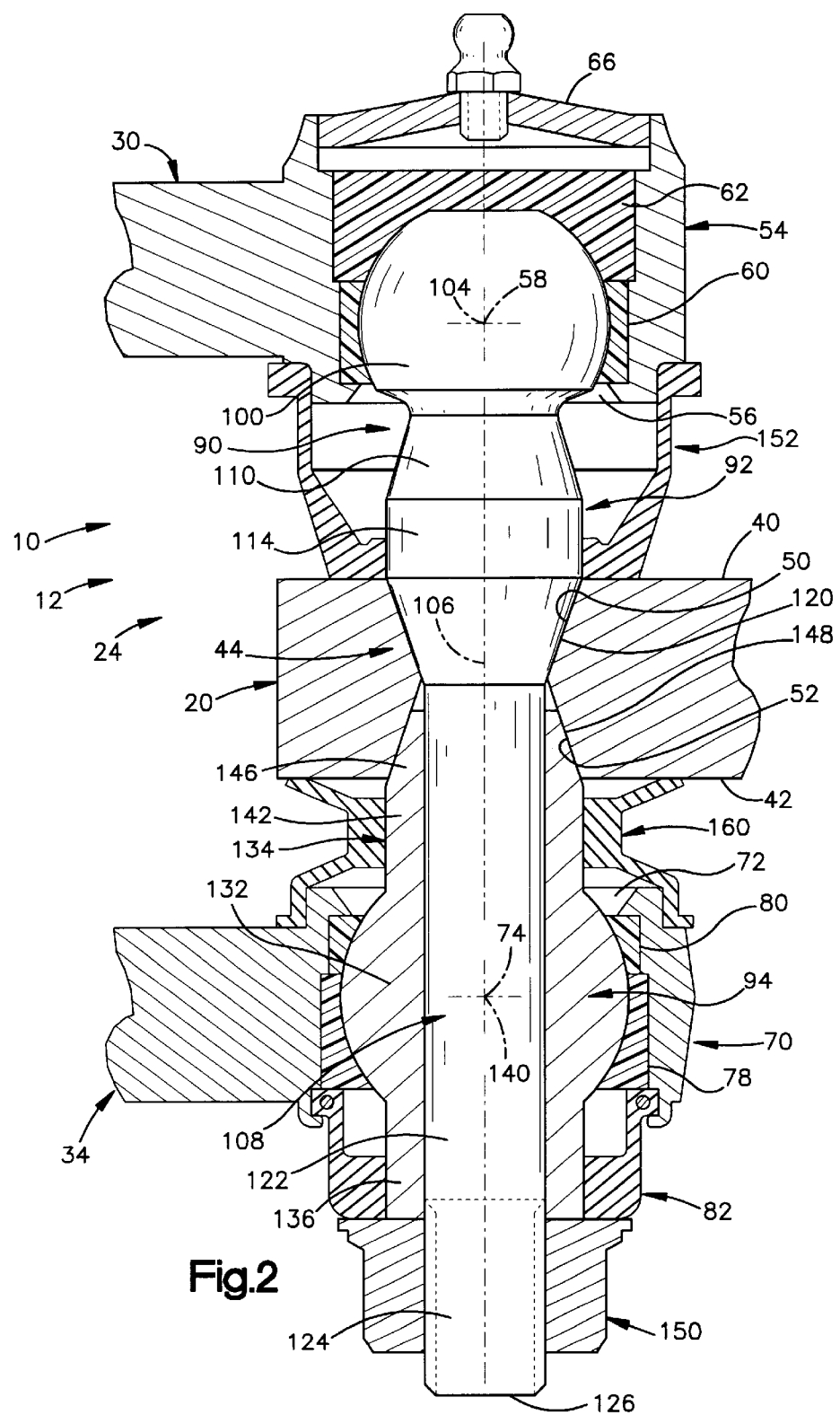
FIG. 2 is an enlarged view of a portion of the steering linkage of FIG. 1 including the ball joint assembly.
Figure 3:
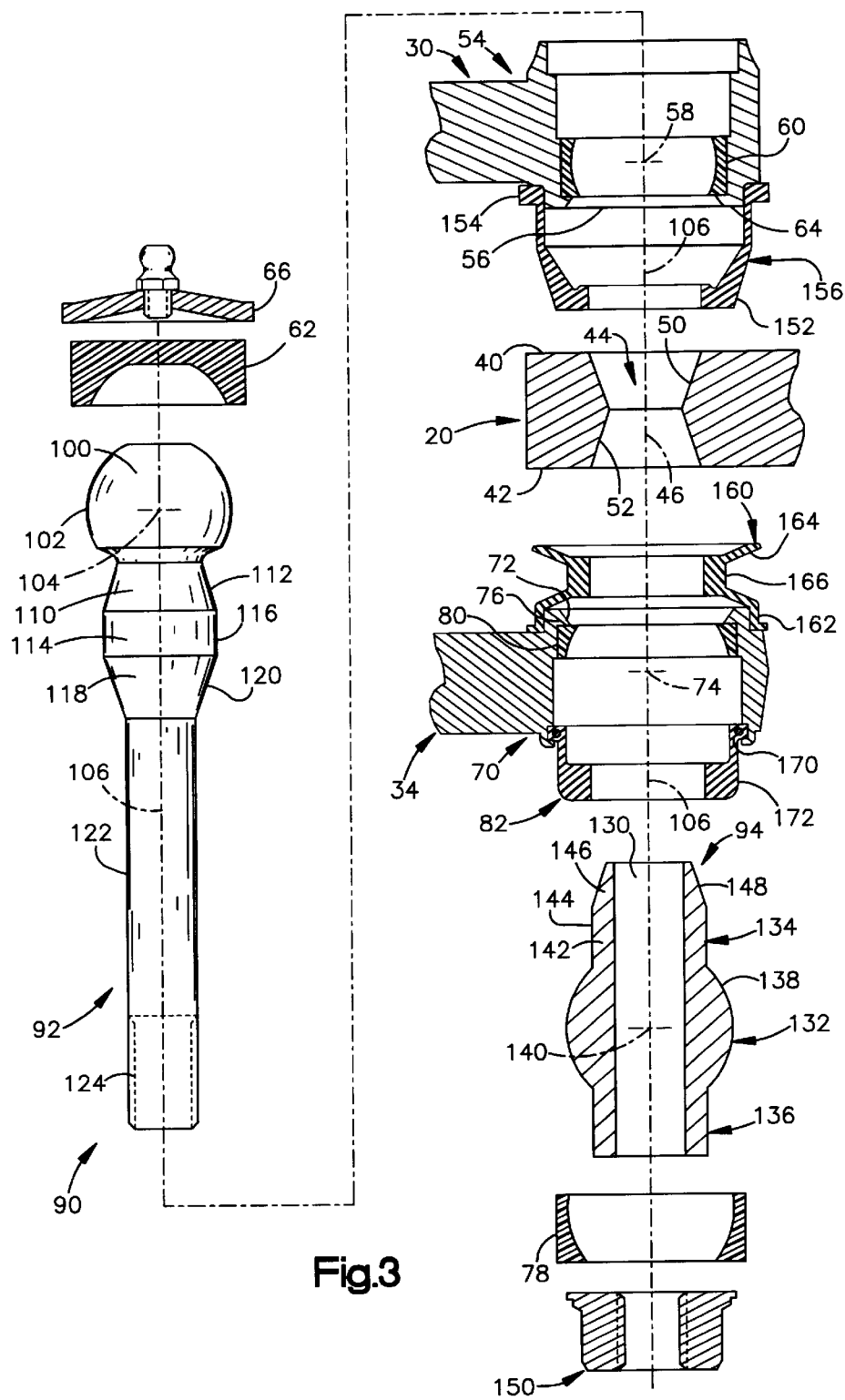
FIG. 3 is an exploded view of the ball joint assembly of FIG. 2.

The portion of the right steering knuckle 20 that is shown in FIGS. 2 and 3 has first and second opposite side surfaces 40 and 42. The steering knuckle 20 has a through hole 44 that extends between the side surfaces 40 and 42. The through hole 44 has a centerline 46.

A first end of the through hole 44 has a first tapered surface 50 that extends inward from the first side surface 40. In the illustrated embodiment, the first tapered surface 50 extends at an angle of twenty degrees to the centerline 46. The angle could be different in different embodiments.

The opposite second end of the through hole 44 has a second tapered surface 52 that extends inward from the second side surface 42. The second tapered surface 52 faces in the opposite direction from the first tapered surface 50. In the illustrated embodiment, the second tapered surface 52 extends at an angle of twenty degrees to the centerline 46. The angle could be different in different embodiments, and could be the same as, or different than, the angle of the first tapered surface 50.

The drag link 30 includes a drag link socket 54 located on an end portion of the drag link. The drag link socket 54 is fixed for movement with the drag link 30. The drag link socket 54 has an opening 56 that is presented toward the first side surface 40 of the steering knuckle 20 and toward the tie rod 34. The drag link socket 54 defines a first center of rotation 58.

A two-piece bearing 60, 62 is located in the drag link socket 54. An end portion 64 of the socket 54 is crimped over to hold the bearing piece 60 in place in the socket. A grease fitting 66 closes the other end of the socket 54 adjacent the bearing piece 62.

The tie rod 34 includes a tie rod socket 70 located on an end portion of the tie rod. The tie rod socket 70 is fixed for movement with the tie rod 34. The tie rod socket 70 has an opening 72 that is presented toward the second side surface 42 of the steering knuckle 20 and toward the drag link socket 54. Thus, the through hole 44 in the steering knuckle 20 is located between the drag link socket 54 and the tie rod socket 70. The tie rod socket 70 defines a second center of rotation 74.

A two-piece bearing 78, 80 is located in the tie rod socket 70. An end portion 76 of the socket 70 is crimped over to hold the bearing piece 76 in place in the socket. A seal 82 is crimped in position to retain the bearing piece 78 in the socket 70.

The ball joint includes a two-part ball stud 90. The two-part ball stud 90 includes an inner stud part or first stud part 92, by which steering force is transmitted from the drag link 30 to the steering knuckle 20. The two-part ball stud 90 also includes an outer stud part or second stud part 94 (cross-axis ball stud), by which steering force is transmitted from the drag link 30 to the tie rod 34.

The first stud part 92 is formed as one piece and has a ball end portion 100. The ball end portion 100 is configured to be received in the bearing 60, 62 in the drag link socket 54. Thus, the ball end portion 100 has a part-spherical outer surface 102 centered on a center of rotation 104. The center of rotation 104 is located on a linear longitudinal central axis 106 of the ball stud 90.

The first stud part 92 also has a shank portion 108. The shank portion 108 has a first section 110 that extends from the ball end portion 100. The first section 110 has a tapered outer surface 112 centered on the axis 106 and extending at an angle to the axis 106. The narrow end of the tapered surface 112 is adjacent the ball end portion 100 to provide room for pivoting movement of the ball end portion.

The shank portion 108 of the first stud part 92 has a second section 114 extending from the tapered first section 110. The second section 114 has a cylindrical outer surface 116 centered on the axis 106.

The shank portion 108 of the first stud part 92 has a third section 118 extending from the cylindrical second section 114 in a direction away from the ball end portion 100. The third section 118 has a tapered outer surface 120 centered on the axis 106. The tapered outer surface 120 extends at an angle (FIG. 2) relative to the axis 106 that is the same as the angle of the first tapered surface 50 of the steering knuckle 20. Thus, the tapered third section 118 of the first stud part 92 is receivable in a tight, form-fitting engagement with the steering knuckle 20.

The shank portion 108 of the first stud part 92 also has a fourth section 122 that extends from the third section 118 in a direction away from the ball end portion 100. The fourth section 122 has a cylindrical configuration centered on the axis 106. The fourth section 122 has a smaller diameter than the narrowest part of the through hole 44 in the steering knuckle 20. The fourth section 122 terminates in a threaded end portion 124 of the first stud part 92. The end portion 124 forms a projecting end portion 126 of the ball stud 90.

The second stud part 94 is formed as a sleeve that fits over the cylindrical fourth section 122 of the first stud part 92. The second stud part 94 is rotationally symmetrical about the axis 106. The second stud part 94 has a cylindrical central opening, or passage 130 that extends completely through the second stud part from end to end. The diameter of the opening 130 is the same as, or just slightly larger than, the outer diameter of the fourth section 122 of the first stud part 92. As a result, the second stud part 94 may be rotatable relative to the first stud part 92, about the axis 106.

The second stud part 94 has a ball portion 132 located between first and second end portions 134 and 136. The ball portion 132 is configured to be received in the bearing 76, 78 in the tie rod socket 70. Thus, the ball portion 132 has a part-spherical outer surface 138 centered on an axis of rotation 140. The axis of rotation 140 is located on the central axis 106. The central opening 130 extends through the ball portion 132 of the second stud part 94.

The first end portion, or inner end portion 134 of the second stud part 94, has a first section 142 that extends from the ball portion 132. The first section 142 has a cylindrical outer surface 144 centered on the axis 106. The central opening 130 extends through the first section 142.

The first end portion 134 has a second section 146 that extends from the first section 142 in a direction away from the ball portion 132. The second section 146 has a tapered outer surface 148. The tapered surface 148 on the second stud part 94 faces in the opposite direction from the tapered surface 120 on the first stud part 92. The tapered surface 148 extends at an angle relative to the axis 106 that is the same as the angle of the second tapered surface 52 of the steering knuckle 20. Thus, the tapered surface 148 on the second stud part 94 is receivable in a tight, form-fitting engagement with the second tapered surface 63 of the steering knuckle 20. The tapered surface 148 is centered on the axis 106. The central opening 130 extends through the second section 146.

The second end portion, or outer end portion 136 of the second stud part 94, has a cylindrical configuration centered on the axis 106. The central opening 130 extends through the second end portion 136 of the second stud part 94.

When the ball joint 10 is assembled, as shown in FIG. 2, the second stud part 94 is fitted over the cylindrical fourth section 122 of the first stud part 92. The fourth section 122 of the first stud part 92 extends completely through the central opening 130 in the second stud part 94.

The ball end portion 100 of the first stud part 92 is received in the drag link socket 54. The center of rotation 104 of the ball end portion 100 is coincident with the center of rotation 58 of the drag link socket 54. As a result, the first stud part 92 is supported by the bearing pieces 60, 62 for pivotal and rotational movement relative to the drag link socket 54, and thus relative to the drag link 30 as a whole.

The ball portion 132 of the second stud part 94 is received in the tie rod socket 70. The center of rotation 140 of the ball portion 132 is coincident with the center of rotation 74 of the tie rod socket 70. As a result, the second stud part 94 is supported by the bearing pieces 76, 78 for pivotal and rotational movement relative to the tie rod socket 70, and thus relative to the tie rod 34 as a whole. Therefore, the ball stud 90 interconnects the tie rod 34 and the drag link 30 for relative pivoting and rotational movement.

At the same time, the shank portion 108 of the first stud part 92 extends through the through hole 44 in the steering knuckle 20. The tapered third section 118 of the first stud part 92 is located radially inward of the first tapered surface 50 of the steering knuckle 20. Also, the inner end portion 134 of the second stud part 94 extends into the through hole 44 in the steering knuckle 20. The tapered section 146 of the inner end portion 134 of the second stud part 94 is located radially inward of the second tapered surface 52 of the steering knuckle 20.

A nut 150 is screwed onto the projecting threaded portion 124 of the shank portion 108 of the ball stud 90 and is tightened, into engagement with the outer end portion 136 of the second stud part 94. The tapered third section 118 of the first stud part 92 is pulled into a tight, form-fitting engagement with the first tapered surface 50 of the steering knuckle 20. The tapered section 146 of the inner end portion 134 of the second stud part 94 is pulled into a tight, form-fitting engagement with the second tapered surface 52 of the steering knuckle 20.

As a result, the two parts 92 and 94 of the ball stud 90 are fixed for movement with each other and with the steering knuckle 20. The ball end portion 100 of the ball stud 90 is rotatable within the drag link socket 54. The ball portion 132 of the ball stud 90 is rotatable within the tie rod socket 70.

The ball joint 10 includes a plurality of seals for sealing between the ball stud 90 and the other parts of the steering linkage 24. A first seal 152 is located between the drag link socket 54 and the ball stud 90. A first end portion 154 of the first seal 152 is clamped or otherwise secured on, and seals against, the drag link socket 54. A second end portion 156 of the first seal 152 is located on and seals against the cylindrical second section 144 of the first stud part 92. The second end portion 156 of the first seal 152 also engages and seals against the first side surface 40 of the steering knuckle 20.

A second seal 160 is located between the tie rod socket 70 and the ball stud 90. A first end portion 162 of the second seal 160 is clamped or otherwise secured on, and seals against, the tie rod socket 70. A second end portion 164 of the second seal 160 seals against the second side surface 42 of the steering knuckle 20. An intermediate portion 166 of the second seal 160 seals against the cylindrical portion 122 of the second stud part 94.

The third seal 82 is located between the tie rod socket 70 and the second stud part 94. A first end portion 170 of the third seal 82 is crimped in, and seals against, the tie rod socket 70. A second end portion 172 of the third seal 82 seals against the cylindrical portion 136 of the second stud part 94. The second end portion 172 of the third seal 82 also engages and seals against the nut 150.

When the ball joint 10 is thus assembled with the other parts of the steering linkage 24, the center of rotation 58 of the drag link socket 54, and the center of rotation 74 of the tie rod socket 70, lie along the axis 106 of the stud 90. The axis 106 extends through the through hole 44 of the steering knuckle 20. Specifically, the axis 106 is coincident with the centerline 46 of the through hole 44 in the steering knuckle 20.

The three connections of the ball joint 10—that is, the connection with the drag link 30, the connection with the steering knuckle 20, and the connection with the tie rod 34—are stacked, generally vertically, along one linear axis 106. The axis 106 extends transverse, and typically perpendicular, to the direction of movement (left-right, as viewed in FIG. 2) of the steering knuckle 20. This provides a very compact construction of the ball joint 10 and of the interconnection between the drag link 30, the steering knuckle 20, and the tie rod 34. For example, the distance between the center of rotation 58 of the drag link socket 54, and the center of rotation 74 of the tie rod socket 70, can be reduced to 84 millimeters or less. This construction also provides improved steering feel and consistency.

From the above description of the invention, those skilled in the art will perceive improvements, changes and modifications in the invention. Such improvements, changes and modifications within the skill of the art are intended to be covered by the appended claims.

Having described the invention, we claim:

1. Apparatus for use in a vehicle, comprising:
    a first steering link having a first socket fixed for movement with said first link;
    a second steering link having a second socket fixed for movement with said second link;
    a steering knuckle having a through hole; and
    a stud extending through said through hole and interconnecting said first and second sockets, said stud comprising a first stud part and a second stud part;
    said first stud part comprising a first ball portion received in said first socket to connect said first stud part for pivotal movement relative to said first link and a shank portion in one piece with said first ball portion and not separate parts secured together, said shank portion projecting from said first ball portion;
    said second stud part having a second ball portion received in said second socket to connect said second stud part for pivotal movement relative to said second link;
    said second stud part having a through passage extending axially entirely through said second stud part including said second ball portion; and
    said shank portion of said first stud part extending through said through hole in said steering knuckle and entirely through said axially extending through passage in said second stud part.

2. Apparatus as set forth in claim 1 further including a pitman arm located on one side of the vehicle, said steering knuckle being on the other side of the vehicle, said first steering link being a drag link extending from said pitman arm to said steering knuckle, said second steering link being a tie rod, said tie rod extending from said steering knuckle to the one side of the vehicle.

3. Apparatus as set forth in claim 1 wherein said first socket and said through hole in said steering knuckle and said second socket are stacked vertically along one linear axis and centered on said axis.

4. Apparatus as set forth in claim 3 wherein said axis extends generally perpendicular to the direction of movement of said steering knuckle.

5. Apparatus as set forth in claim 3 wherein said first and second stud parts are centered on said axis.

6. Apparatus for use in a vehicle, comprising:
    an axially extending stud comprising a first stud part and a second stud part;
    said first stud part comprising a first ball portion and a shank portion in one piece with said first ball portion and not separate parts secured together, said shank portion projecting from said first ball portion;
    said second stud part having a second ball portion and two axially extending portions in one piece with said second ball portion and not separate parts secured together, said two axially extending portions projecting from said second ball portion in opposite axial directions, said second stud part having a through passage extending axially entirely through said second stud part including said second ball portion and said two axially extending portions;
    said shank portion of said first stud part being for extending entirely through said axially extending through passage in said second stud part;
    said shank portion of said first stud part having an end for projecting from said axially extending through passage through said second stud part, said end of said first stud part being threaded;
    a nut for threading on said end; and
    said first and second stud parts, when assembled, being centered on an axis extending through centers of said first and second ball portions.

7. Apparatus for use in a vehicle, comprising:
    a first steering link having a first socket fixed for movement with said first link;
    a second steering link having a second socket fixed for movement with said second link;

a steering knuckle having a through hole; and a stud comprising a first stud part and a second stud part;

said first stud part comprising a first ball portion received in said first socket to connect said first stud part for pivotal movement relative to said first link and a shank portion projecting from said first ball portion;

said second stud part having a second ball portion received in said second socket to connect said second stud part for pivotal movement relative to said second link;

said second stud part having a through opening extending axially through said second stud part; and said shank portion of said first stud part extending through said through hole in said steering knuckle and through said axially extending through opening in said second stud part, said shank portion of said first stud part having an end which projects from said axially extending through opening through said second stud part and further comprising a fastener on said end for securing said first and second stud parts together.

8. Apparatus as defined in claim 7 wherein said end of said first stud part is threaded and said fastener is a nut threaded on said end.

9. Apparatus as defined in claim 8 wherein said nut abuts one end of said second stud part and forces the other end of said second stud part into engagement with said steering knuckle.

10. Apparatus for use in a vehicle, comprising:

an axially extending stud comprising a first stud part and a second stud part;

said first stud part comprising a first ball portion and a shank portion in one piece with said first ball portion and not two separate parts secured together, said shank portion projecting from said first ball portion;

said second stud part having a second ball portion and two axially extending portions in one piece with said second ball portion and not separate pieces secured together, each of said two axially extending portions projecting from said second ball portion in opposite axial directions, said second stud part having a through passage extending axially entirely through said second stud part including said second ball portion and said two axially extending portions;

said shank portion of said first stud part being for extending entirely through said axially extending through passage in said second stud part;

said shank portion of said first stud part having an end for projecting from said axially extending through opening through said second stud part, and said first and second stud parts, when assembled, being centered on an axis extending through centers of said first and second ball portions.

* * * * *